United States Patent [19]

Large

[11] 4,384,658

[45] May 24, 1983

[54] DISPENSING MAGNETIC ARTICLES

[75] Inventor: Donald M. Large, Temple, Pa.

[73] Assignee: Western Electric Company, Inc., New York, N.Y.

[21] Appl. No.: 243,397

[22] Filed: Mar. 13, 1981

[51] Int. Cl.³ .............................................. B65H 3/16
[52] U.S. Cl. ........................................ 221/1; 221/212
[58] Field of Search ........................... 221/1, 212, 298; 209/904, 907; 198/492; 193/32, 40

[56] References Cited

U.S. PATENT DOCUMENTS

| 2,415,376 | 2/1947 | Strickland, Jr. | 193/32 X |
| 3,026,406 | 3/1962 | Van Den Blink | 193/32 X |
| 3,311,259 | 3/1967 | Brown | 221/1 |

Primary Examiner—Stanley H. Tollberg
Attorney, Agent, or Firm—D. C. Watson

[57] ABSTRACT

Magnetic articles (10) are advanced in single file within a tube (14) for dispensing therefrom. A first magnetic device (20) establishes a magnetic field to releasably seize the leading article (10) such that trailing articles (10) are stopped in the tube (14). A second magnetic device (22) operates at a fixed location along the tube (14) and establishes a magnetic field to releasably seize the next trailing article (10) in the tube (14). A mechanism (40) then indexes the device (20) with the seized, leading article (10) a sufficient distance away from attraction of the second device (20) such that, when the leading article (10) is released by device (20), it is also released from tube (14).

12 Claims, 6 Drawing Figures

DISPENSING MAGNETIC ARTICLES

TECHNICAL FIELD

This invention relates to dispensing magnetic articles. More particularly, this invention relates to dispensing magnetic articles from a feeding apparatus individually and successively in an oriented manner.

BACKGROUND OF THE INVENTION

In the assembly of products in a production line, small articles are sometimes individually introduced into receiving apertures of larger components. For example, in assembling a telephone, small compression springs are each inserted into one of an array of apertures comparable to an array of push buttons on a telephone set. A problem is to insert such light articles in a rapid, positive and economical manner.

Initially, each spring was manually inserted into an aperture in a funnel block having the desired array of apertues. The funnel block was then aligned with the telephone set and a fully array of springs were transferred to the set. More recently, attempts were made to vibratory load the springs into such funnel blocks. However, the springs are so light and responsive to vibration that such loading is fraught with difficulty. Even assuming that the loading could be accomplished by vibratory methods, each array of springs must then be transferred to a set. Consequently, it would seem better to introduce the springs directly into a telephone set.

Assuming such articles contain magnetic material, i.e., material which is attracted to a magnet, it would seem advantageous to magnetically manipulate the parts to achieve the assembly. One problem is that articles behave differently in a magnetic field depending upon the complexity of their structural elements. For example, if an article is solid and elongate, like an iron reed, its behavior is predictable. In a field having linear and coparallel flux lines, the reed will become oriented parallel to the flux lines. The behavior of articles having complex structural elements is not so predictable. For example, an elongate, helically coiled spring is found to become oriented transversely of linear, coparallel flux lines.

U.S. Pat. No. 3,311,259 to F. J. Brown discloses a system for magnetically dispensing from a tube, relatively heavy articles having a simple magnetic structure. The system induces repelling forces into articles at their contacting ends. The pressure of articles in a file holds such articles when a dual magnet assembly is indexed to separate and dispense a leading article. It is advantageous to have a system which is more readily adaptable to articles regardless of weight or magnetic structure so that file pressure and/or induced poles are of minor importance.

SUMMARY OF THE INVENTION

In view of the foregoing, it is an object of this invention to provide new and improved apparatus and methods for dispensing magnetic articles. Another object of the invention is to maintain orientation of articles as they are dispensed even though such articles may have complex magnetic structures. A further object is to dispense such magnetic articles individually and successively.

With these and other objects in mind, the present invention includes a tube adapted for advancing the articles in single file along a pathway. A first magnetic device is provided for releasably seizing the leading article in the file such that trailing articles are stopped along the pathway. A second magnetic device is provided, fixedly located with respect to the direction in which the pathway extends, for releasably seizing the next trailing article in the file; and apparatus is provided for releasing the leading article from the pathway.

In another embodiment, the apparatus for releasing the leading article includes mechanisms for operating the first and second magnetic devices in stages. In a further embodiment such operating mechanisms include mechanisms for advancing a seized, leading article along the pathway a sufficient distance away from attraction of the second magnetic device such that when said leading article is released from the first magnetic device, it is also released from the pathway.

In a method for dispensing magnetic articles, such articles are advanced in single file along a pathway and the leading article is releasably seized by first magnetic means such that trailing articles are stopped along the pathway. The next, trailing article in the file is then releasably seized by a second magnetic device, which is fixedly located with respect to the direction in which the pathway extends, and said leading article is then released from the pathway.

BRIEF DESCRIPTION OF THE DRAWINGS

The above-described and other objects, advantages and features of the invention will be more readily understood from the following detailed description when read in conjunction with the accompanying drawing, wherein.

Figure 1:
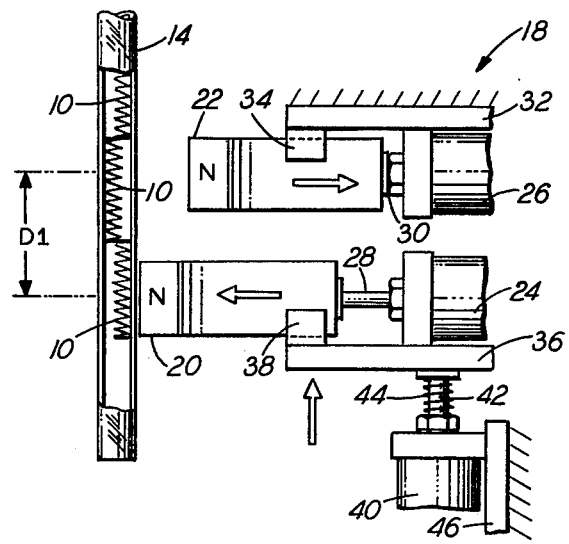
FIG. 1 is an elevational view, depicted partially schematically, of apparatus in a first stage for dispensing magnetic articles in accordance with the instant invention.

It can be seen that some elements in the figures are abbreviated or simplified to highlight certain features of the invention. Also, where appropriate, reference numerals have been repeated in the figures to designate the same or corresponding features in the drawing.

DETAILED DESCRIPTION

The Magnetic Articles

Figure 2:
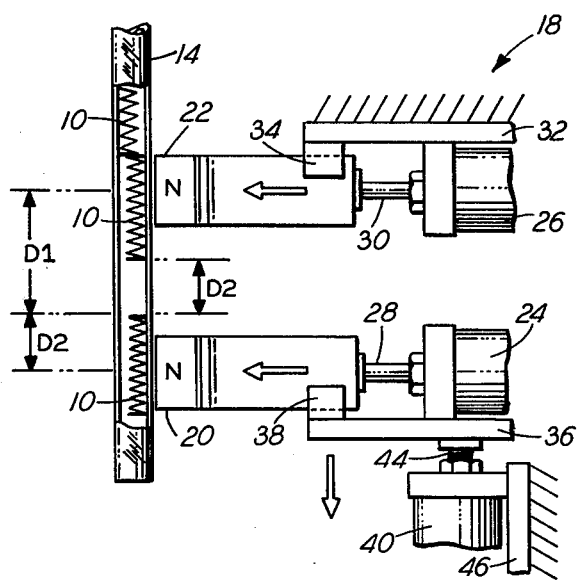
FIG. 2 is the same view as FIG. 1, wherein the apparatus is in a second stage for dispensing such articles.
Figure 3:
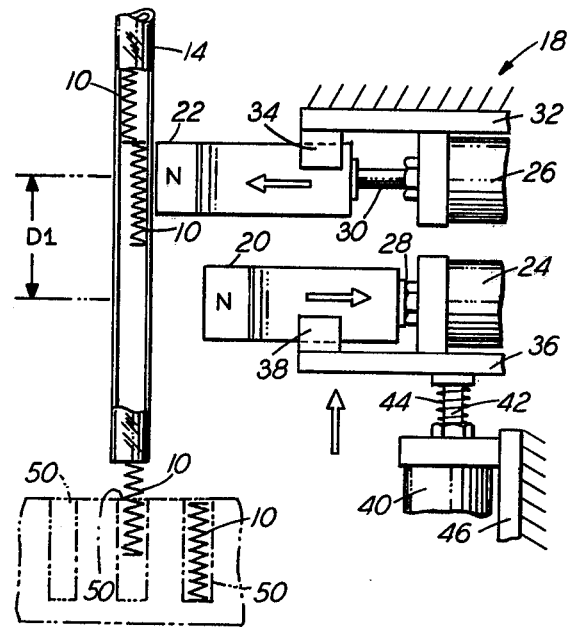
FIG. 3 is the same view as FIG. 1, wherein the apparatus is in a third stage for dispensing such articles.

In each of FIGS. 1-3, there appears at least one magnetic article 10 which is dispensed from a tube in the practice of the invention. For purposes of illustration and discussion, the articles 10 will often be referred to hereinafter as compression springs 10. However, it will be appreciated that other magnetic articles can as well be dispensed in the practice of the invention.

Referring to FIG. 1, the spring 10 has a cylindrical shape, typically about 5 m.m. in diameter and about 25 m.m. in length. Such shape is formed by winding a wire element about a theoretical cylinder and crossing right sections thereof at constant oblique angles to form a helix. Circular coils are wound in right cross sectional planes at each end to obtain the cylindrical shape. Such circular ends permit the springs to be disposed with upright posture in vertical apertures or in a tube.

The circular ends also permit the springs to be longitudinally disposed, in single file and in contact with little fear of entanglement. When so disposed in a vertical column extending to a height of about 1 to 2 meters, there is little compression of the lower springs because of the light weight of the articles in the column. Each article is constructed of about 22 cm. of 32 gauge wire for a total weight of about 0.13 grams. Because of their light weight and spring temper, the articles 10 are quite resilient and tend to bounce readily when any longitudinal movement thereof is blocked by an escapement mechanism.

Although the articles 10 are referred to as compression springs, it is seen that they tend to revert to their original shape after being extended or compressed. Such articles 10 would be expected to have more complex kinetic behavior than solid, linear articles.

The fact that the springs become oriented transversely of linear, coparallel flux lines, suggests that a series of paths of low reluctance passes through or between loops formed by the coils and a path of high magnetic reluctance passes along the longitudinal axis of a spring 10. Accordingly, one would expect a series of north pole phenomena extending along one side of the cylindrical shape and a concomitant series of south pole phenomena extending along a diametrically opposite side. It is likely that such phenomena run in gently curving spirals rather than straight lines because of imperfect symmetry of construction. Clearly, the complexity of such construction calls for a reliable technique for guidably controlling the orientation and kinetic behavior of the articles 10.

Advancing The Articles

Vibratory loaders are conventionally employed to feed articles such as compression springs 10 into tubes for guidance. Thereafter such articles 10 are typically advanced by an artificially applied force such as air pressure. For advancing the articles vertically downward, either air pressure or the force of gravity or both may be employed.

Referring to FIGS. 1-3, a tube 14 can be seen advancing articles 10 in a vertically downward manner. In the illustrative example, the springs 10 are advanced in intimate contact in single file within the tube 14. Such a tube 14 need not be closed along the longitudinal axis if mechanical forces or the force of gravity are applied to the articles. Of course, if air pressure is employed, a fully closed pathway afforded by tube 14 is desirable.

Tube 14 may be constructed of conventional materials which are either rigid or flexible. When a magnetic escapement is employed, as in FIGS. 1-3, the tube material should be non-magnetic, i.e., it should not be attracted to a magnet. A clear, plastic material provides an excellent tube 14 because articles 10 can be visually observed. Such tubing is flexible, inexpensive and non-magnetic.

Although only one tube 14 is shown in FIGS. 1-3, it should be evident that a plurality of tubes 14 delivering a plurality of articles 10 could be employed in the practice of the invention. For example, to load an array of twelve apertures in a telephone set, a group of twelve tubes 14 could be employed to deliver articles 10 to an escapement assembly. Thereafter, such tubes can be converged and terminated in an array of ends corresponding to the array of apertures in a telephone set.

The Magnetic Escapement

Referring to FIGS. 1-3, a magnetic escapement is seen designated generally by the numeral 18. Escapement 18 includes a first magnetic device 20 which will also be referred to herein as a lower device 20 for the preferred embodiment of the invention. Device 20 is provided to releasably seize the leading article 10 in a vertical file of articles such that trailing articles 10 are stopped along tube 14. Device 20 establishes a magnetic field within tube 14 which is sufficiently strong, when taken with the magnetic structure of the articles 10, to seize the leading article and resist pressure thereupon from the file of articles 10. Such pressure includes the weight of such column and any other advancing forces applied thereto.

Above device 20 there is a second, similar magnetic device 22 which is provided to releasably seize the next trailing article in the file. It will be seen that device 22 has properties which are similar to those described for device 20. It will also be seen that device 22 is operated at a fixed location along tube 14 for the articles 10.

In the illustrative example, device 20 is reciprocated toward and away from tube 14 by a mechanism 24. Device 22 is similarly reciprocated by a mechanism 26. For descriptive purposes mechanisms 24 and 26 will be considered as air driven cylinders having pistons 28 and 30, respectively. Cylinder 26 is mounted to a fixed plate 32 having a member 34 to guide the magnetic device 22. Cylinder 24 is mounted to an indexable plate 36 having a member 38 to guide the magnetic device 20. Plate 36 and the apparatus mounted thereon are indexed downwardly by a mechanism 40 which is here considered as an air driven cylinder having a piston 42 which is upwardly biased by a compression spring 44. Cylinder 40 is mounted to a plate 46 which positions device 20 such that there is a given distance D1 between the centerlines of devices 20 and 22 in FIG. 1 when piston 42 is in the up or extended position. It will be seen that mechanisms 24, 26 and 40 could as well be other reciprocating mechanisms such as solenoids for driving piston rods. It will also be appreciated that the reciprocal motion need not be linear. For example, devices 20 and 22 could be pivotally mounted so the active ends thereof would move arcuately toward or away from tube 14.

Operation

The apparatus for releasing the leading article from the pathway is advantageously operated in three stages exemplified by FIGS. 1, 2 and 3. In FIG. 1, device 20 is moved toward tube 14 to establish a magnetic field therein to seize the leading article 10 such that trailing articles 10 are stopped along tube 14. Device 22 is moved away from tube 14 to remove its magnetic field sufficiently from tube 14 to release an article 10 therefrom.

In FIG. 2, the device 22 is moved toward tube 14 to establish a magnetic field therein to seize the next trailing article in the file. Device 20 remains adjacent to tube 14, still seizing the leading article 10. However, cylinder 40 is now operated to downwardly index plate 36, cylinder 24 and device 20. The result is that the leading article 10 is separated from the next trailing article 10 to avoid any magnetism induced therefrom. Such leading article is also advanced along the pathway 14 a distance D2 to avoid effective field attraction of the device 22 upon such leading article 10.

In FIG. 3, device 22 remains adjacent to tube 14, still seizing the next trailing article 10. However, cylinder 24 is operated to withdraw device 20 from tube 14, releasing the leading article from the magnetic field. Also, cylinder 40 is released whereby spring 44 returns the plate 36, cylinder 24 and device 20 to the initial position. When the leading article 10 is released, it advances downwardly out of the pathway formed by tube 14 and into an aperture 50 in a telephone set.

The Magnetic Devices

Figure 4:
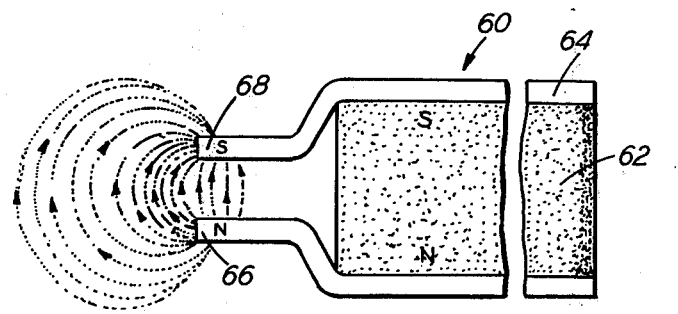
FIG. 4 is a plan view of a preferred, permanent type magnet for dispensing articles in accordance with the instant invention.
Figure 5:
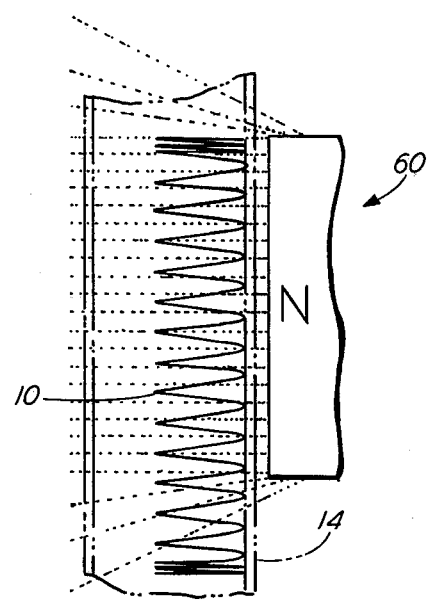
FIG. 5 is an elevational view of the magnet shown in FIG. 4.

FIGS. 4 and 5 illustrate a magnetic device designated generally by the numeral 60 which is preferred for either or both devices 20 and 22 in the practice of the invention. Device 60 includes a core magnet 62 which is about 0.38 inches thick by about 0.75 inches high by about 2.0 inches long. A suitable material for magnet 62 is a molded permanent magnet material such as that sold by 3M Company of Minneapolis, Minnesota under the trade name "Plastiform Natsyn PL-1." Core 62 is magnetized through its thickness which establishes two major surfaces having the polarity designated in FIG. 4. Magnet 62 is enclosed between a sheet-like member 64 which is about 0.05 inches thick and made of hot rolled steel which is permeable to magnetic flux. Member 64 is formed along two sides into substantially parallel pole pieces 66 and 68, each being disposed adjacent to and extending along tube 14.

Referring again to FIGS. 4 and 5, it can be seen that magnet 62 establishes, through sheet 64 and its pole pieces 66 and 68, an advantageous magnetic field for seizing articles 10. Note that the flux from pole pieces 66 and 68 travel in essentially horizontal paths in the figures. Note also, at a given elevation in tube 14, that successive, planar layers of flux are established extending transversely of tube 14, at least in the mid-height portion of device 60. Such layers are seen to be preferable for springs 10 because the layers extend along paths of low reluctance therein.

The effect of such flux layers upon a spring is shown in FIG. 5. The spring 10 is drawn with substantially uniform pressure upon the inside wall of tube 14. It will be appreciated that an article having a linear reed structure would also be drawn upon the wall but with an accompanying torque action. Since each end of such a linear article tends to exhibit polar phenomena, one end would be attracted to a pole 66 and the other to a pole 68 to form a force couple. Such a couple would assist in gripping a wall of a tube 14.

Alternate Embodiments

It will be apparent to a practitioner of ordinary skill in the art that there are interacting relationships among many aspects and features of the invention. It has been mentioned that the magnetic devices create force fields of sufficient strength to seize a leading article and hold it against the weight of the file of articles and other advancing forces. If the force fields are very strong, if the articles retain magnetism well or if the articles are very inductive of magnetism, the problem of separating the articles may be accented. The preferred embodiment shown in FIGS. 1–3 is considered to be quite tolerant of miss-matches in these relationships. Nevertheless, it seems evident that a practitioner can, with little experimentation, determine the proper relationship among the aspects and features of the invention to dispense a particular magnetic article. In this regard, it should be apparent that the leading article need not be advanced before it is released if a careful relationship is achieved between the strength of the force fields, the distance D1 and the magnetic structure of the articles 10.

Figure 6:
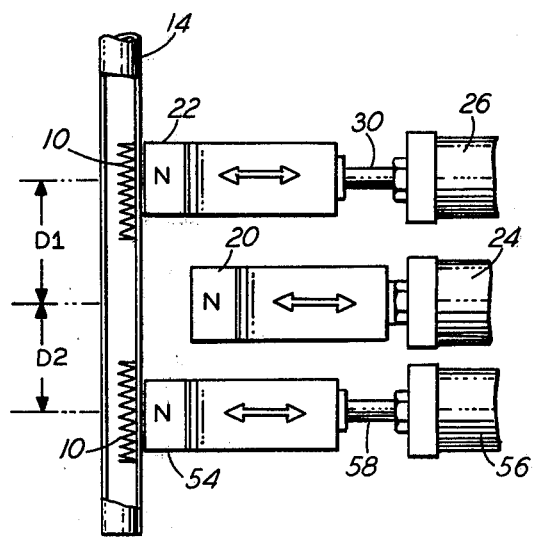
FIG. 6 is an elevational view, also shown partially schematically, of apparatus including three magnetic devices, for dispensing magnetic articles.

It is noted that an extensive setting of distance D1 or the indexing of a device 20 are practiced to avoid parasitic magnetism of device 22 upon a leading article 10. Another way to avoid parasitic magnetism on the leading article is shown in FIG. 6. Instead of seizing the leading article and advancing it away from the second magnetic field, an offsetting magnetic field is created.

In the illustrated embodiment of FIG. 6, the cylinder 24 is mounted in a fixed position along tube 14 and device 20 also operates at a fixed location along tube 14. A third magnetic device 54 is provided at a distance D2 from the first device 20. Device 54 is operated by a mechanism 56 which is here considered as an air driven cylinder connected to device 54 by a piston 58. Cylinder 54 is mounted in a fixed position and device 54 operates at a fixed location along tube 14.

The function of the third device 54 is to releasably attract the leading article 10 sufficiently to offset attraction of the second device 22 upon such article. Such function could be considered a substitute for the indexing feature shown and described for device 20 in the preferred embodiment.

Although there are three stages of operation, for simplicity FIG. 6 illustrates only a second stage in operation of the embodiment. In the first stage the upper device 22 is withdrawn and the middle and lower devices 20 and 54, respectively, are extended. At this stage the leading article 10 is seized by device 20 and the lower device 54 attracts such article sufficiently to offset later attraction by the upper device 22 thereupon. In the second stage, as exemplified in FIG. 6, the device 22 is extended to tube 14 to seize the next trailing article 10 in the file and device 20 is thereupon withdrawn to release the leading article 10. Such leading article is permitted to advance beyond effective attraction thereupon by device 22 and, in the third stage, device 54 is withdrawn to release such leading article 10 from tube 14. If the devices 20, 22 and 54 are all of the same magnetic attraction, it is often desirable, although not absolutely necessary, to hold distance D2 equal to or less than D1.

It will be appreciated that many magnetic devices 20, 22 or 54 could as well be employed in the practice of the invention. Permanent magnets have previously been alluded to which are reciprocated either linearly or arcuately. Electromagnets could as well be used with switches to selectively energize circuits such that selected ones of the articles are seized or released. Flux absorption shields could also be employed in combination with fixed magnetic devices. For example, soft iron plates could be inserted between respective magnets and articles to seize or release selected ones of such articles.

There have been illustrated herein certain embodiments of the invention and certain applications thereof. Nevertheless, it is to be understood that various modifications and refinements may be made and used which differ from these disclosed embodiments without departing from the spirit and scope of the present invention.

What is claimed is:

1. Apparatus for dispensing magnetic articles, comprising:
   means for advancing the articles in single file along a pathway;
   first magnetic means for releasably seizing the leading article in the file such that trailing articles are stopped along the pathway;
   second magnetic means, for operation at a fixed location along the pathway, for releasably seizing the next trailing article in the file;
   means for advancing a seized, leading article along the pathway a sufficient distance from attraction of the second magnetic means that when said article is released by the first magnetic means, said article is also released from the pathway; and
   means for releasing said leading article from the pathway.

2. Apparatus as in claim 1, wherein the means for releasing the leading article further comprises:
   means for operating the first and second magnetic means in stages, first to seize the leading article, second to also seize the next trailing article and third, after the seized, leading article is sufficiently advanced, to release the leading article from the first magnetic means such that said leading article is released from the pathway.

3. Apparatus as in claim 1 wherein the magnetic means include permanent type magnets, further comprising:
   means for reciprocating respective magnets toward and away from the pathway to seize or release selected ones of the articles.

4. Apparatus as in claim 1 wherein the magnetic means include electromagnets, further comprising:
   means for selectively energizing respective electromagnets to seize or release selected ones of the articles.

5. Apparatus as in claim 1, wherein the magnetic means include flux absorption shields and, further comprising:
   means for withdrawing or inserting said shields between respective magnets and articles to seize or release selected ones of such articles.

6. Apparatus as in claim 1, wherein the advancing means further comprises:
   a tube made of non-magnetic material; and
   means for supplying power therein, to advance the articles in an oriented manner.

7. Apparatus as in claim 1, wherein the magnetic means further comprises:
   a permanent type magnet having two major, polar surfaces;
   magnetically permeable sheet-like members covering at least the two polar surfaces and ending in two linear ends formed into substantially parallel pole pieces, each disposed adjacent to and extending along the pathway such that successive, planar layers of flux are established transversely of the pathway.

8. A method of dispensing magnetic articles, comprising:
   advancing the articles in single file along a pathway;
   releasably seizing the leading article in the file with first magnetic means such that trailing articles are stopped along the pathway;
   releasably seizing the next trailing article in the file with second magnetic means operating at a fixed location along the pathway;
   advancing the seized leading article along the pathway, a sufficient distance from attraction of the second magnetic means that when said article is released by the first magnetic means, said article is also released from the pathway, and
   releasing said leading article from the pathway.

9. A method as in claim 8, wherein the releasing step further comprises:
   operating the first and second magnetic means in stages, first to seize the leading article, second to also seize the next trailing article and third, after the seized, leading article is sufficiently advanced, to release said leading article from the first magnetic means to release said leading article from the pathway.

10. A method as in claim 8, wherein the magnetic means include permanent type magnets, further comprising, as part of the releasing step:
    reciprocating respective permanent magnets toward or away from the pathway to seize or release selected ones of the articles.

11. A method as in claim 8 wherein the magnetic means include electromagnets, further comprising, as part of the releasing step:
    selectively energizing respective electromagnets to seize or release selected ones of articles.

12. A method as in claim 8, wherein the magnetic means include flux absorption shields, further comprising, as part of the releasing step:
    withdrawing or inserting shields between respective magnets and articles to seize or release selected ones of the articles.

* * * * *